(12) United States Patent
Ferris

(10) Patent No.: US 9,703,609 B2
(45) Date of Patent: Jul. 11, 2017

(54) MATCHING RESOURCES ASSOCIATED WITH A VIRTUAL MACHINE TO OFFERED RESOURCES

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 894 days.

(21) Appl. No.: 12/475,228

(22) Filed: May 29, 2009

(65) Prior Publication Data

US 2010/0306379 A1    Dec. 2, 2010

(51) Int. Cl.
*G06F 15/173*    (2006.01)
*G06F 9/50*    (2006.01)

(52) U.S. Cl.
CPC .................. *G06F 9/5072* (2013.01)

(58) Field of Classification Search
CPC ............. G06F 9/5072; G06F 9/5077
USPC ....................................... 709/226
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0010544 A1* | 1/2004 | Slater et al. ............ 709/203 |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |

(Continued)

OTHER PUBLICATIONS

Morgan, "Systems and Methods for Generating Optimized Resource Consumption Periods for Multiple Users on Combined Basis", U.S. Appl. No. 13/037,359, filed Mar. 1, 2011.

(Continued)

*Primary Examiner* — Joseph Greene
(74) *Attorney, Agent, or Firm* — Lowenstein Sandler LLP

(57) ABSTRACT

A marketplace system can provide an interface to cloud management systems that allows the cloud management systems to specify desired computing resources and a value for providing those resources. The marketplace engine can provide the interface to third-party controlled systems to specify computing resources being offer to cloud computing systems. The marketplace engine can match the desired resources to the offers to provide computing resources and notify the cloud management systems and third-party controlled systems of the match. Additionally, the cloud management systems can utilize the marketplace to aid in valuing computing resources to be added to the cloud.

20 Claims, 6 Drawing Sheets

(56) References Cited

U.S. PATENT DOCUMENTS

| | | |
|---|---|---|
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0201253 A1* | 8/2008 | Gray et al. ............ 705/37 |
| 2008/0215796 A1 | 9/2008 | Lam et al. |
| 2008/0240150 A1 | 10/2008 | Dias et al. |
| 2008/0244579 A1* | 10/2008 | Muller ............ G06F 9/5027 718/100 |
| 2008/0255953 A1* | 10/2008 | Chang et al. ............ 705/14 |
| 2008/0301027 A1* | 12/2008 | Boss ............ G06Q 10/06 705/37 |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1* | 11/2009 | Nickolov et al. ............ 717/177 |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0088126 A1* | 4/2010 | Iaia et al. ............ 705/5 |
| 2010/0088205 A1* | 4/2010 | Robertson ............ 705/34 |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0169893 A1* | 7/2010 | Collins ............ G06F 9/5044 718/105 |
| 2010/0220622 A1 | 9/2010 | Wei |
| 2010/0299366 A1 | 11/2010 | Stienhans et al. |
| 2011/0016214 A1 | 1/2011 | Jackson |
| 2011/0131335 A1 | 6/2011 | Spaltro et al. |

OTHER PUBLICATIONS

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

DeHaan, "Methods and Systems for Abstracting Cloud Management", U.S. Appl. No. 12/474,113, filed May 28, 2009.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

DeHaan et al., "Systems and Methods for Power Management in Managed Network Having Hardware-Based and Virtual Reources", U.S. Appl. No. 12/475,448, filed May 29, 2009.

DeHaan et al., "Methods and Systems for Flexible Cloud Management with Power Management Support", U.S. Appl. No. 12/473,987, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan, "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris, "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environment", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

(56) References Cited

OTHER PUBLICATIONS

Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Ferris, et al., "Systems and Methods for Cominatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in a Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.

* cited by examiner

MATCHING RESOURCES ASSOCIATED WITH A VIRTUAL MACHINE TO OFFERED RESOURCES

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

In application specific computing environments, individual users may be able to add their particular computing resources to assist in performing computing processes. For example, the Search for Extraterrestrial Intelligence (SETI) program allows individual users to contribute the processing power of their personal systems for performing mathematical computations on experimental data. In these application specific computing environments, the user does not have an ability to track or receive any compensation of the computing power provided.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for extending cloud resources to third party resources. More particularly, embodiments relate to platforms and techniques in which a marketplace system can provide a marketplace for clouds seeking computing resources and third parties offering computing resources to the cloud.

According to embodiments, a marketplace system can be configured to include a marketplace engine to provide a marketplace for receiving, advertising, and matching resources desired by clouds and offered to clouds for third-party controlled computing systems. The marketplace engine can be configured to provide an interface to cloud management systems that allows the cloud management systems to specify desired computing resources and a value for providing those resources. Likewise, the marketplace engine can be configured to provide the interface to third-party controlled systems to specify computing resources being offer to cloud computing systems.

According to embodiments, the marketplace engine can be configured match the desired resources to the offers to provide computing resources and notify the cloud management systems and third-party controlled systems of the match. Additionally, the cloud management systems can utilize the marketplace to aid in valuing computing resources to be added to the cloud.

By offering value for specific resources contributed to the cloud, an operator of a cloud computing environment can provide incentive to third-party users for contributing resources to the environment. Additionally, by tying the grant of access to a service agreement, the operator of the cloud computing environment can enhance the reliability of the third-party resources. Additionally, by utilizing a marketplace, both the cloud and the third-party users can maximize the value received for resources. As such, the operator can enhance the flexibility, power, and reliability of the cloud environment without committing dedicated resources to the cloud.

Figure 1:
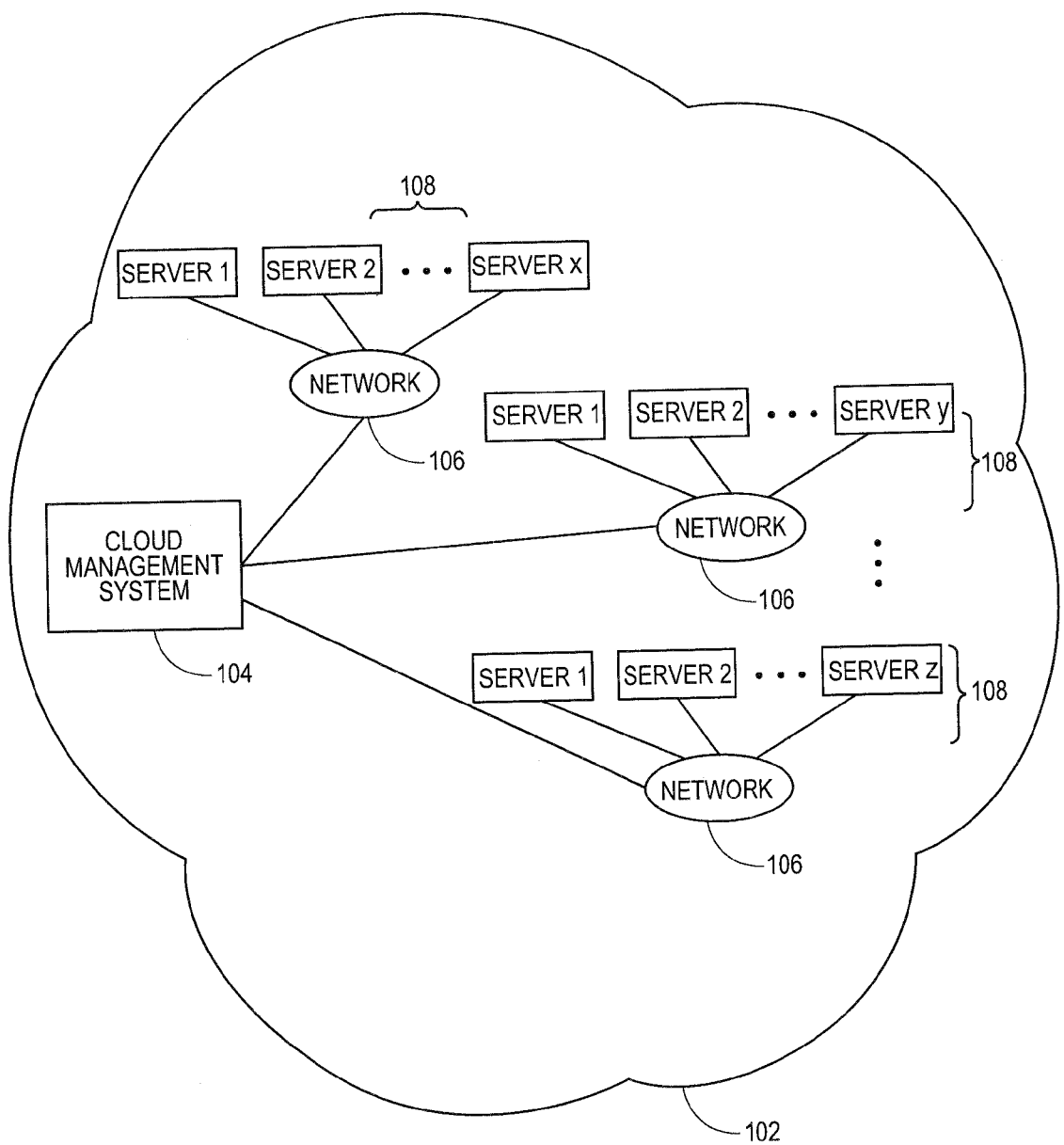
FIG. 1 illustrates an overall cloud system architecture in which various embodiments of the present teachings can be practiced.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
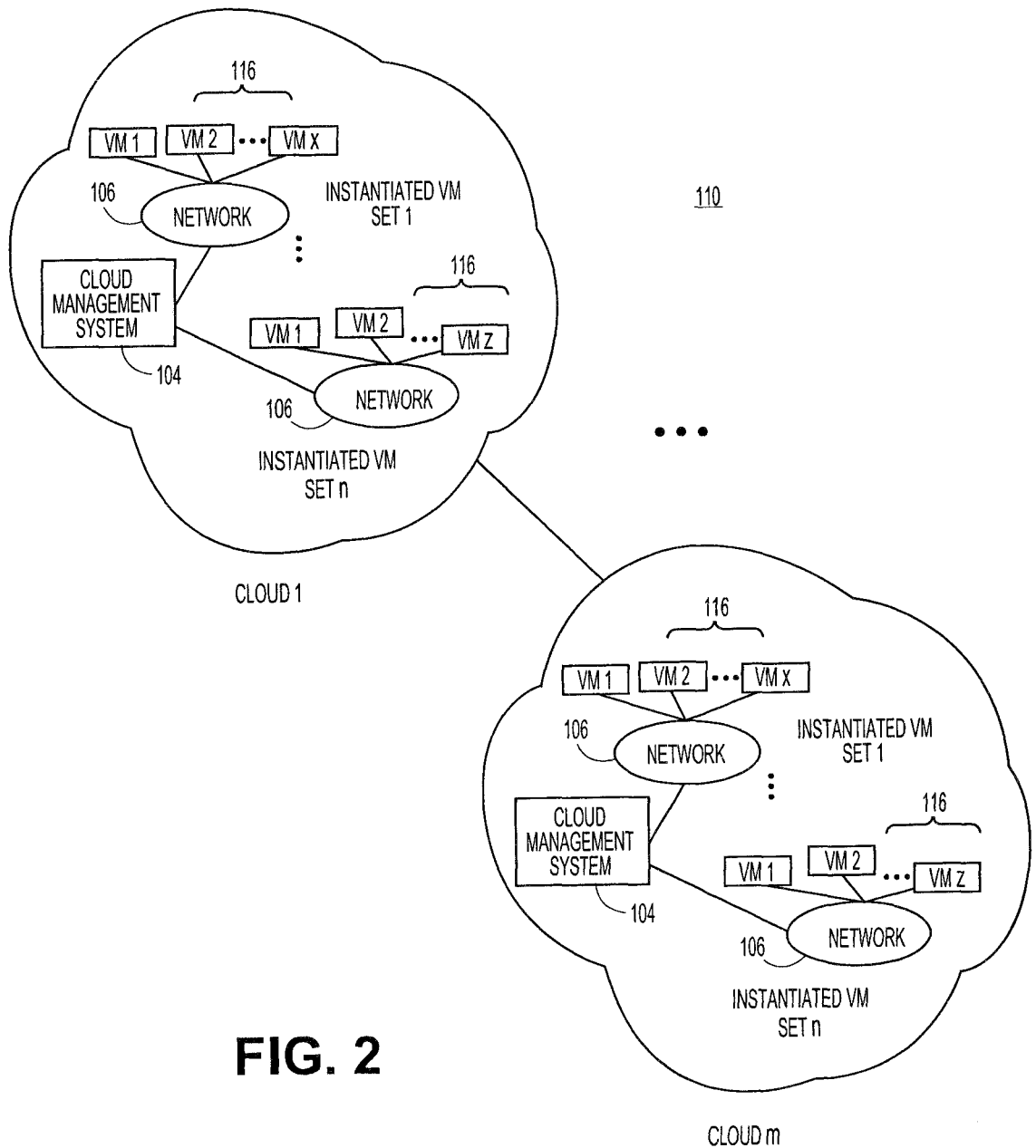
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
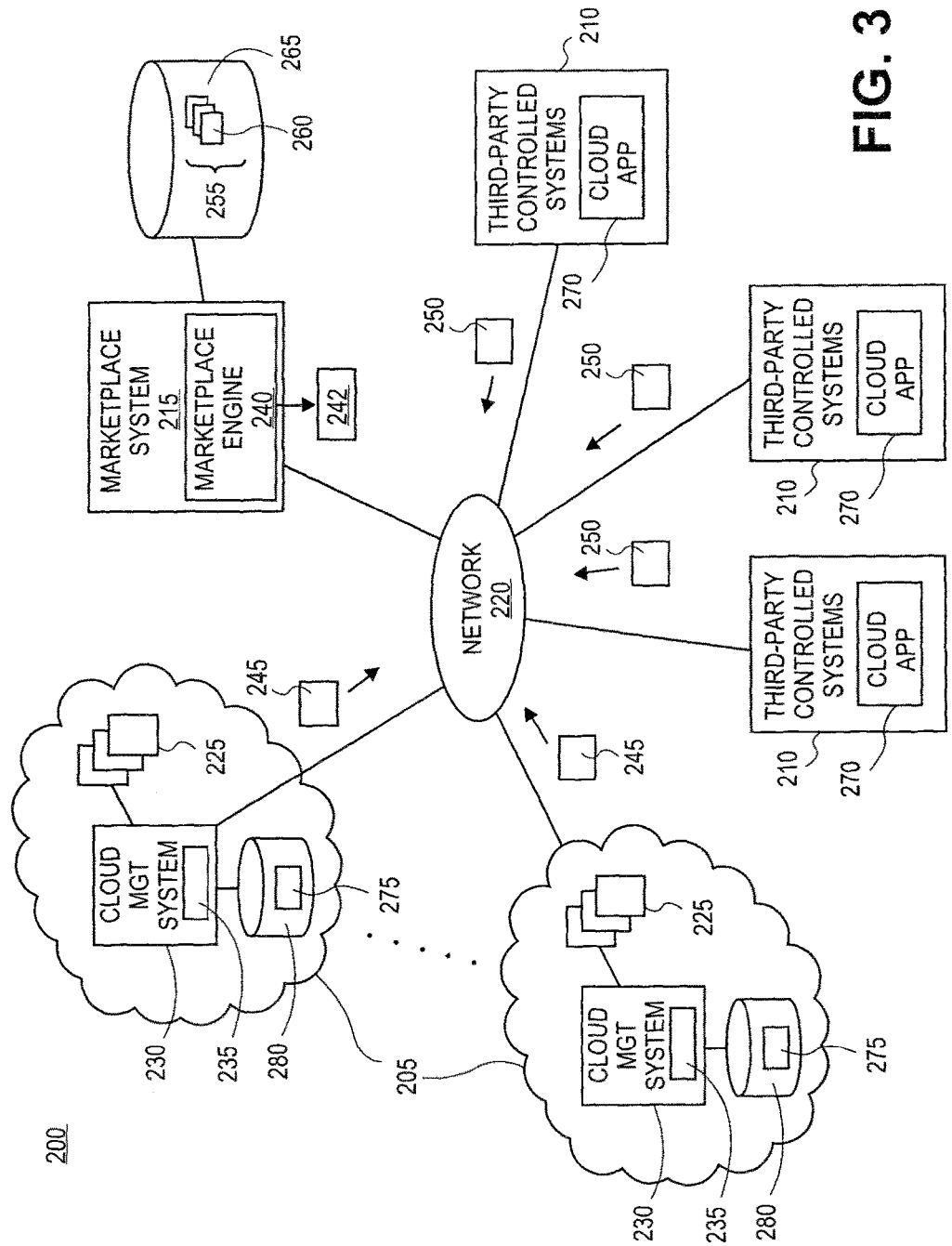
FIG. 3 illustrates an overall system in which a marketplace system can be provided a marketplace for computing resources to be added to clouds, according to various embodiments.

FIG. 3 illustrates aspects of a system which can generate a marketplace for computing resources desired by clouds 205 and computing resources offered by third-party systems 210, according to various embodiments. In embodiments, a marketplace system 215 can be configured to communicate with the clouds 205 and the third-party controlled systems 210, via one more more networks 220, to offer the marketplace.

In embodiments, the clouds 205 can include pools of resources 225 under the control of the cloud management systems 230 as described above in FIGS. 1 and 2. As illustrated in FIG. 3, one or more of the clouds 205 can be controlled and owned by a single entity (e.g. company, corporation, etc.) or each of the clouds 205 can be owned by different entities. Based on the usage or expected usage of the clouds 205, one or more of the cloud management systems 230 can be required to add additional resources to the pool of resources 225 in order to meet the demands placed on the clouds 205. For example, one of the clouds 205 can be near 100% utilization of the pool of resources 225 based on the current processes instantiated in the cloud, or, likewise, based on current demand, the cloud management system 230 can expect increased utilization of the pool of resources 225 at a future point. Additionally, one or more of the cloud management systems 230 can desire to increase the pool of resources 225 for any reason, such as increasing revenue generated by the cloud. As such, one or more of the cloud management systems 230 may need to add additional resources to the pool of resources 225. Typically, any of the pool of resources 225 can be increased by adding fixed and dedicated resources to the pool of resources 225.

In embodiments, one or more of the cloud management systems 230 can desire to leverage third-party controlled computing resources, such as the computing resources of the third-party controlled systems 210, in order to increase the resources offered by the clouds 205. In embodiments, the third-party controlled systems 210 can be any type of computing systems under the control of a user, independent of the owner or operator of the clouds 205. For example, the third-party controlled systems 210 can be one or more personal computers (desktop, laptop, etc.), one or more server computers, and the like, which are under the control of individuals, companies, and the like. The third-party controlled systems 210 can include hardware resources, such as processors, memory, network hardware and bandwidth, storage devices, and the like, and software resources, such as operating systems (OS), application programs, and the like. The third party user of the third-party controlled systems 210 can desire to make the computing resources of the third-party controlled systems 210 available to the clouds 205. As such, the cloud management systems 230 can utilize the computing resources of the third-party controlled systems 210 in the pools of resources 225 of the clouds 205 to host applications, appliances, virtual machines, and the like.

In embodiments, in order to foster the inclusion of the computing resources of third-party controlled systems 210, the cloud management systems 230 can be configured to offer value for the computing resources provided to the clouds 205. In embodiments, to achieve this, the cloud management systems 230 can be configured to include a valuation engine 235. The valuation engine 235 can be configured to determine a value for the computing resources from third-party computing resources. The valuation engine 235 can be configured to determine the value for the computing resources of third-party controlled systems 210 based on a number of factors such as usage of the pool of resources 225, estimated demand on the pool of resources 225, revenue generated by the pool of resources 225, and the like.

In embodiments, the marketplace system 215 can be configured to provide a marketplace for the computing resources desired by the clouds 205 and the computing resources offered by the third-party controlled system 210. The marketplace system 215 can be any type of computing system or other device such as such as a server, personal computer, laptop computer, network-enabled media device, networked station, etc. The marketplace system 215 can be coupled to the one or more networks 220 in order to communicate with the cloud management systems 230 and the third-party controlled systems 210.

In embodiments, to provide the marketplace, the marketplace system 215 can be configured to include a marketplace engine 240. The marketplace engine 240 can be configured to support an interface 242 for receiving an indication 245 of the computing resource desired by the clouds 205 and an indication 250 of the computing resources offered by the third-party controlled systems 210. The interface 242 can be configured to receive the indications 245 and 250 utilizing any type of communication, such as email, web page, text message, and the like. For example, the marketplace engine 240 can be configured to generate and populate a web site with various forms for entering the indications 245 and 250. As such, the marketplace engine 240 can contain the necessary logic to generate graphical user interfaces (GUIs), e.g. dialog boxes and web pages, or contain the necessary logic to utilize other programs or applications to communicate with the cloud management systems 230 and the third-party controlled systems 210.

In embodiments, the indication 245 of the computing resources desired by the clouds 205 can include a variety of information describing the computing resources desired by the cloud 205. For example, the indication 245 can include the type of computing resources desired (processing cycles, memory, storage, bandwidth, operating systems, applications, etc.), the amount of computing resources desired, and the value for the desired computing resources as determined by the valuation engine 235.

In embodiments, the indication 250 of the computing resources offered by the third-party controlled systems 210 can include a variety of information describing the computing resources offered by the third-party controlled systems 210. For example, the indication 250 can include the type of computing resources offered (processing cycles, memory, storage, bandwidth, operating systems, applications, etc.), the amount of computing resources offered, and the value sought for the computing resources.

In embodiments, once the indications 245 and 250 have been received, the marketplace system 215 can be configured to store the indications 245 and 250. The marketplace engine 240 can be configured to store the indications in a set 255 of records 260. The marketplace engine 240 can be configured to maintain the set 255 of records 260 in computer readable storage devices or media 265 (CD, DVD, hard drive, portable storage memory, etc.) whether local to the marketplace system 215 or remotely located.

In embodiments, the set 255 of records 260 can be configured to store all the information related to the indications 245 and 250. Each record 260 in the set 255 can be configured to store the information related to one indication 245 or 250 associated with a unique identifier of the cloud management system 230 or third-party controlled system 210 providing the indication. For example, the set 255 of records 260 can be recorded in a file, tree, database, or other record.

In embodiments, once the indications 245 and 250 have been received, the marketplace system 215 can be configured to provide the indication 245 to the third-party controlled systems 210 and vice versa. To achieve this, the marketplace engine 240 can be configured to provide the indications 245 and 250 by the interface 242. The interface 242 can be configured to provide the indications 245 and 250 utilizing any type of communication, such as email, web page, text message, and the like. For example, the marketplace engine 240 can be configured to generate and populate a web site with various lists containing the indications 245 and 250 associated with the identifiers of the cloud management system 230 and the third-party controlled systems 210 providing the indications 245 and 250. As such, the marketplace engine 240 can contain the necessary logic to generate graphical user interfaces (GUIs), e.g. dialog boxes and web pages, or contain the necessary logic to utilize other programs or applications to communicate with the cloud management systems 230 and the third-party controlled systems 210.

In embodiments, the marketplace system 215 can be configured to match the indications 245 of desired computing resources with indications 250 of computing resources offered. The marketplace engine 240 can be configured to compare the indications 245 and 250 in order to match the computing resources offered and computing resources desired. The marketplace engine 240 can be configured to match the indications 245 and 250 based on which of the computing resources offered and computing resources desired match or most closely match. Likewise, the marketplace engine 240 can be configured to match the indication 245 and 250 based on which of the value offered or the value sought match or most closely match. One skilled in the art will realize that the marketplace engine 240 can be configured to utilize any type of statistical method or algorithm and criterion to match the indications 245 and 250.

In embodiments, once matched, the marketplace system 215 can be configured to notify the cloud management systems 230 and the third-party controlled systems 210 associated with the matching indications 245 and 250. To achieve this, the marketplace engine 240 can be configured to notify the cloud management systems 230 and the third-party controlled systems 210 by the interface 242. The interface 242 can be configured to notify the cloud management systems 230 and the third-party controlled systems 210 utilizing any type of communication, such as email, web page, text message, and the like, as described above.

In embodiments, the marketplace system 215 can be configured to enable the cloud management system 230 and the third-party controlled system 210 to communicate. For example, the cloud management system 230 and the third-party controlled system 210 can desire to communicate in order to discuss the computing resources offered and desired, to discuss the value offered and sought for the computing resources, to discuss and/or accept the computing resources offered, and the like. To achieve this, the marketplace engine 240 can be configured to provide communication tools and channels by the interface 242. For example, the marketplace engine 240 can be configured to generate and populate a web site with chat and messaging tools and interfaces that allow the cloud management system 230 and the third-party controlled systems 210 to communicate. As such, the marketplace engine 240 can contain the necessary logic to generate graphical user interfaces (GUIs), e.g. dialog boxes and web pages, or contain the necessary logic to utilize other programs or applications to communicate with the cloud management systems 230 and the third-party controlled systems 210.

In embodiments, as described above, the valuation engine 235 of each of the cloud management systems 230 can be configured to determine the value for the computing resources of third-party systems based on a number of factors. The valuation engine 235 can be configured to determine the current usage of the pool of resources 225 in order to value the computing resources based on need. The valuation engine 235 can be configured to examine the pool of resources 225 to determine the current usage. For example, the valuation engine 235 can determine the amount of the pool of resources 225 that are currently used and the amount of the pool of resources 225 that are available. For example, the valuation engine 235 can examine the processes instantiated on the pool of resources 225 and determine a percent utilization, such as 50%, 60%, etc. The amount can include the current usage of particular resources such as the amount of memory utilized, the amount of computing power (processing cycles) utilized, the amount of communication bandwidth utilized, the amount of storage utilized, the amount of software resources utilized (OS utilization, specific application utilization, etc.), and the like.

In embodiments, once the valuation engine 235 determines current usage, the valuation engine 235 can be configured to determine estimated demand for the pool of resources 225 in the future. The valuation engine 235 can be configured to determine the estimated demand based on an expected usage of the pool of resources 225. For example, the valuation engine 235 can determine that each month for the past year the cloud 205 increased utilization of the pool of resources 225 by 2%. Based on this, the valuation engine 235 can determine that the cloud 205 may need an increase in resources of at least 2% each month. One skilled in the art will realize that the valuation engine 235 can be configured to utilize any type of statistical method or algorithm to determine estimated demand. Additionally, the valuation engine 235 can be configured to determine the estimated demand for each specific resource such as the estimated amount of memory, the estimated amount of computing power, the estimated amount of communication bandwidth, the estimated amount of storage, the estimated amount of software resources utilized, and the like.

In embodiments, the valuation engine 235 can be configured to determine the revenue received for usage of the cloud 205 and/or an expected revenue received for usage of the cloud 102. For example, the valuation engine 235 can determine the revenue received as a percentage of the usage of the pool of resources 225 based on past revenue. Additionally, the valuation engine 235 can be configured to determine the revenue for each specific resource such as the revenue per amount of memory, the revenue per amount of computing power, the revenue per amount of communication bandwidth, the revenue per amount of storage, the revenue per amount of software resources utilized, and the like.

In embodiments, once the usage, estimated demand, and revenue are determined, the valuation engine 235 can be configured to determine the value of the computing resources provided to the cloud based on one or more of the usage, estimated demand, and revenue. Based of this, the valuation engine 235 can determine the value of the computing resources desired by the cloud in order to meet the demand on the cloud 205 and generate positive revenue for the cloud 205. For example, the valuation engine 235 can determine that the pool of resources 225 is 90% utilized, that the cloud usage will increase each month by 2%, and that each 1% of cloud 102 utilization generates $100 of revenue. Based on this, the valuation engine 235 can value each 1% of the the computing resources provided at, for example, $20 in order to generate positive revenue.

In embodiments, additionally, the valuation engine 235 can be configured to account for necessity when determining the value of the computing resources of the third-party controlled systems. For example, the valuation engine 235 can determine that the pool of resources 225 is 40% utilized, that the cloud usage will increase each month by 2%, and that each 1% of the cloud usage generates $100 of revenue. Based on the under utilization of the pool of resources 225, the valuation engine 235 can value each 1% of the the computing resources provided at, for example, $1.

In embodiments, the valuation engine 235 can be configured to determine the value for each specific resource such as the value for an amount of memory, the value for an amount of computing power, the value for an amount of communication bandwidth, the value for an amount of storage, the value for an amount of software resources, and the like.

In embodiments, additionally, the valuation engine 235 can be configured to account for the duration of the computing resources provided when determining the value of the computing resources. For example, the valuation engine 235 can determine a higher value for the computing resources that are provided for a longer duration and visa versa.

In embodiments as described above, the valuation engine 235 can be configured to utilize certain factors such as current usage, estimated demand, revenue generated, and duration when determining a value for the computing resources desired. One skilled in the art will realize that the valuation engine 235 can utilize any number of factors in determining a value for the resources provide to the clouds 205. For example, the valuation engine 235 can utilize such factors as cost of adding dedicated resources to the pool of resources 225, the availability of third-party controlled resources, the value placed on third-party controlled resources by other clouds, previous determined value of third-party controlled resources, the replacement cost of the third-party controlled resources, and the like.

In embodiments, the valuation engine 235 can be configured to utilize the indications 245 and 250 from other cloud 205 and the third-party controlled systems 210 to determine the value of the computing resources desired. The valuation engine 235 can examine the value offered by other cloud 205 and the value sought by the third-party controlled systems 210 to determine the value for the computing resources desired. For example, the valuation engine 235 can determine a value for the computing resources desired that is comparative or competitive with the value other clouds 205 place on similar computing resources. Likewise, for example, the valuation engine 235 can determine a value for the computing resources desired that is comparative with or lower than the value sought by the third-party controlled systems 210 in order to encourage the third-party controlled systems 210 to choose to provide the computing resources. One skilled in the art will realize that the valuation engine 235 can be configured to utilize any type of statistical method or algorithm or factor to base the value of the computing resources desired on the value other clouds 205 and third-party controlled systems 210 have placed on the computing resources.

In embodiments, once a particular third-party controlled system 210 has agreed to supply resources at a determined value, the valuation engine 235 can be configured to determine the particular value of the computing resources supplied. The valuation engine 235 can be configured to apply the determined value to the specifications of the supplied computing resources. For example, if the computing resources represent 1% of the pool of resources 225, offered for two months and the value is $20, per 1%, per month, the valuation engine 235 can determine that the particular value of the supplied computing resources is $20 per month or $40 for two months total.

In embodiments, once the particular value of the supplied computing resources is determined, the cloud management system 230 can be configured to return the particular value to the particular third-party controlled system 210 system as a service level agreement for the supplied computing resources. If accepted, the cloud management system 230 can allocate the supplied computing resources to the pool of resources 225.

In embodiments, to make the computing resources available for allocation, the third-party controlled system 210 can include a cloud application 270. The cloud application 270 can be configured to allow the user to make a set of the computing resources of the third-party controlled system 210 available to the cloud management system 230. The cloud application 270 can be configured to allow the cloud management system 230 to request computing resources from the set of computing resources. In response to requests, the cloud application 270 can be configured to provide access to the set of computing resources for use by the cloud management system 230.

In embodiments, the cloud application 270 can be configured to contain necessary logic for identifying and providing accesses to a set of computing resources of the third-party controlled system 210 and for communicating with the cloud management system 230. For example, the cloud application 270 can be configured to contain logic for communicating with the hardware resources of the third-party controlled system 210 (e.g. processor, memory, storage devices, communications interfaces, etc.) and software resources of the third-party controlled system 210 (operating systems, application programs, etc.). For example, the cloud application 270 can be configured to communicate with the OS to identify and allocate resources accessible by the cloud management system 230. Additionally, the cloud application 270 can be configured to allow the user to specify a particular set of computing resources accessible by the cloud management system 230.

In embodiments, the cloud application 270 can be configured to grant access to the set of computing resources. For example, the cloud application 270 can be configured to communicate with the hardware and software resources to grant direct access to the set of resources to the cloud management system 230 for instance, via TCP/IP, FTP or other protocols or channels. Likewise, the cloud application 270 can be configured to receive the processes to be performed on the third-party controlled system 210 and to instantiate the processes on the set of computing resources.

In embodiments, the cloud application 270 can be configured to provide secure communications between the cloud application 270 and the cloud management system 230. The cloud application 270 can be configured to include the necessary logic to perform any known security protocols between the third-party controlled system 210 and the cloud management system 230. For example, the cloud application 270 can be configured to perform authentication (secure login, passwords checks, digital signatures authentication, digital certificate authentication, etc), communication encryption (symmetric cryptography, asymmetric cryptography, etc.), and the like.

Likewise, the cloud management system 230 can be configured to contain logic to directly access, control, and allocate the hardware and software resources of the third-party controlled system 210 as described above.

In embodiments, the cloud management system 200, utilizing the valuation engine 235, can be configured to determine a new value of the computing resources periodically or upon occurrence of events such as dedicated resources being added to the pool of resources 225, user-controlled resources being added to the pool of resources 225, changes in values in the marketplace provided by the marketplace system 215 and/or a change in the factors used to determine the value.

In embodiments, the cloud management system 200 can be configured to offer new service level agreements to the third party users already providing computing resources based on a change in the factors used to determine the value. For example, the cloud management system 200 can be configured to offer a new service level agreement for additional resources to from the third-party controlled systems 210 if demand on the pool of resources 225 increases. Likewise, the change can be based on changes in the values and computing resources offered in the marketplace provided by the marketplace system 215. For example, one or more of the third-party controlled systems 210 can stop providing computing resources in the marketplace. The cloud management system 230 can offer a new service level agreement in order to encourage the third-party controlled systems 210 providing resources to continue to provide resources.

In embodiments, the cloud management system 230 can be configured to maintain a record 275 of the value for the supplied computing resources and any computing resources allocated to the pool of resources 225. The record 275 can include a list of determined values for the various types of resources and a list of the computing resources supplied by the third-party controlled system 210, the particular value for those resources, and specifications of those resources. The cloud management system 230 can be configured to store the record 275 in a computer readable storage medium 280.

Figure 4:
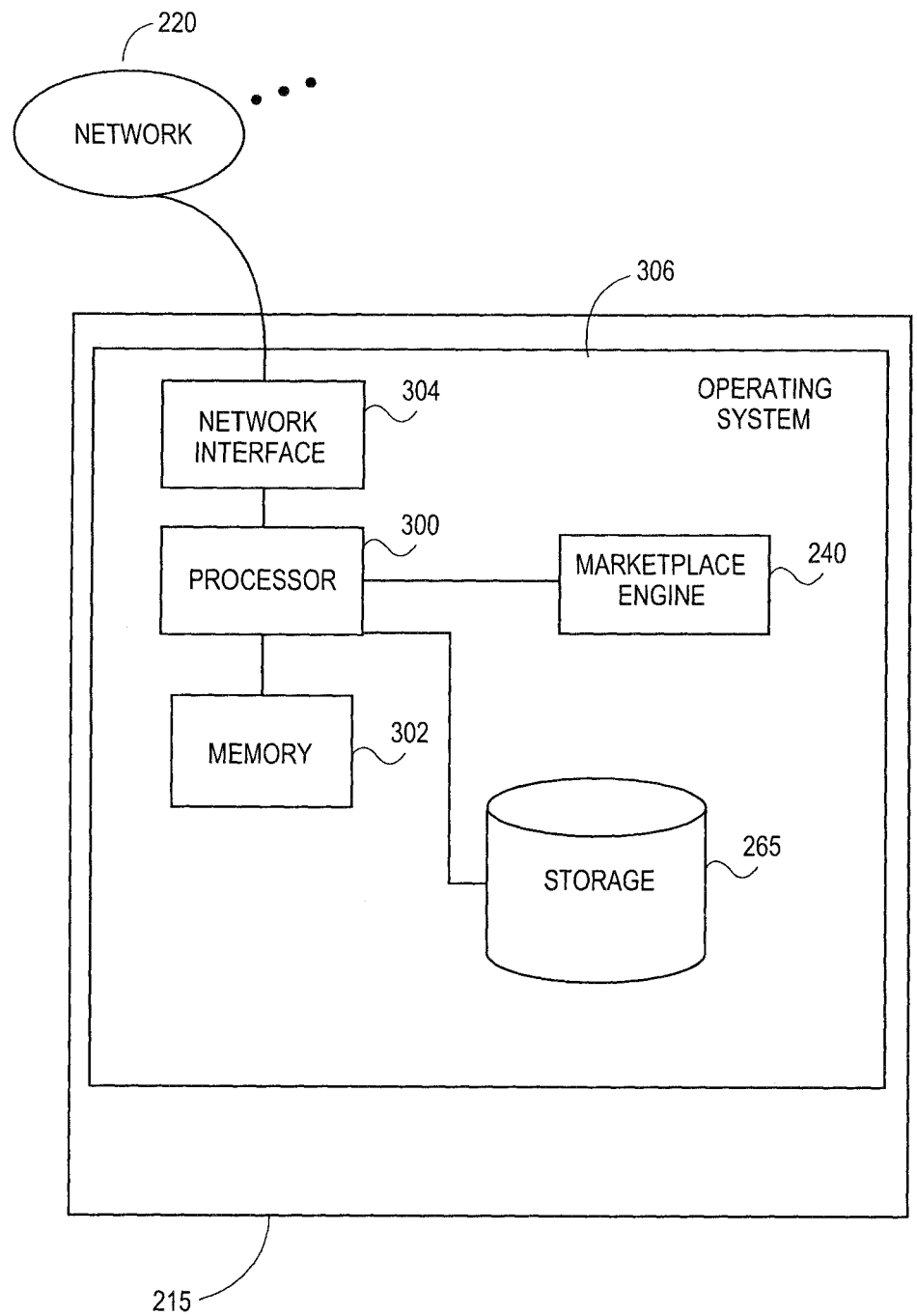
FIG. 4 illustrates an exemplary hardware configuration for the marketplace system, according to various embodiments.

FIG. 4 illustrates an exemplary diagram of hardware and other resources that can be incorporated in the marketplace system 215 and configured to communicate with the clouds 205 and the third-party controlled systems 210 via one or more networks 220, according to embodiments. In embodiments as shown, the marketplace system 215 can comprise a processor 300 communicating with memory 302, such as electronic random access memory, operating under control of or in conjunction with operating system 306. Operating system 306 can be, for example, a distribution of the Linux™ operating system, such as SELinux, the Unix™ operating system, or other open-source or proprietary operating system or platform. Processor 300 also communicates with one or more computer readable storage medium 265, such as hard drives, optical storage, and the like, for maintaining the set 255 of records 260. Processor 300 further communicates with network interface 304, such as an Ethernet or wireless data connection, which in turn communicates with one or more networks 220, such as the Internet or other public or private networks.

Processor 300 also communicates with the marketplace engine 240, to execute control logic and allow for providing a marketplace as described above and below. Other configurations of the marketplace system 215, associated network connections, and other hardware and software resources are possible. Additionally, one skilled in the art will realize that the hardware and software configuration as described in FIG. 3 can be utilized in the cloud management system 230.

While FIG. 4 illustrates the marketplace system 215 as a standalone system including a combination of hardware and software, the marketplace system 215 can include multiple systems operating in cooperation. The marketplace engine 240, can be implemented as a software application or program capable of being executed by the marketplace system 215, as illustrated, or other conventional computer platforms. Likewise, the marketplace engine 240, can also be implemented as a software module or program module capable of being incorporated in other software applications and programs. In either case, the marketplace engine 240 can be implemented in any type of conventional proprietary or open-source computer language. When implemented as a software application or program code, the marketplace engine 240 can be stored in a computer readable storage medium, such as storage 265 accessible by the marketplace system 215.

In embodiments, the valuation engine 235 can be implemented as a software application or program capable of being executed by the cloud management system 230 or other conventional computer platforms. Likewise, the valuation engine 235 can also be implemented as a software module or program module capable of being incorporated in other software applications and programs. In either case, the valuation engine 235 can be implemented in any type of conventional proprietary or open-source computer language. When implemented as a software application or program code, the valuation engine 235 can be stored in a computer readable storage medium, such as storage 280 accessible by the cloud management system 230.

Figure 5:
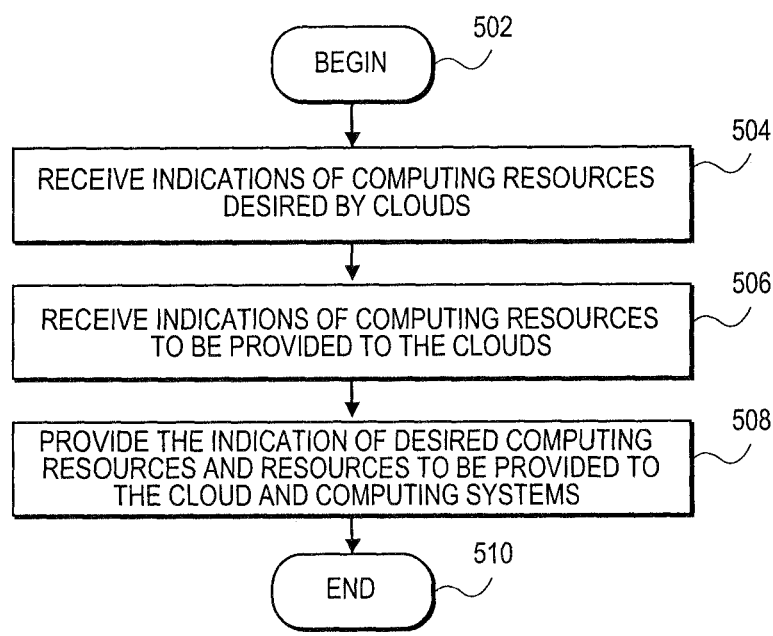
FIG. 5 illustrates a flowchart of an exemplary process for providing the marketplace.

FIG. 5 illustrates a flow diagram of an exemplary process for providing a marketplace for computing resources, according to embodiments. In 502, processing can begin. In 504, the marketplace system 215 can receive indications of computing resources desired by clouds. For example, the indications 245 can be received from the cloud management systems 230 of the cloud 205. The indication 245 of the computing resources desired by the clouds 205 can include a variety of information describing the computing resources desired by the cloud 205. For example, the indication 245 can include the type of computing resources desired (processing cycles, memory, storage, bandwidth, operating systems, applications, etc.), the amount of computing resources desired, and the value for the desired computing resources as determined by the valuation engine 235.

In 506, the marketplace system 215 can receive indications of computing resources to be provided to the clouds. For example, the indications 250 can be received from the third-party controlled systems 210. The indication 250 of the computing resources offered by the third-party controlled systems 210 can include a variety of information describing the computing resources offered by the third-party controlled systems 210. For example, the indication 250 can include the type of computing resources offered (processing cycles, memory, storage, bandwidth, operating systems, applications, etc.), the amount of computing resources offered, and the value sought for the computing resources.

In 508, the marketplace system 215 can provide the indication of desired computing resources and resources to be provided to the cloud and computing systems. For example, the marketplace systems can provide the indications 245 and 250 to all the participating clouds 205 and third-party controlled systems 210. Likewise, the marketplace system 215 can match particular indications 245 and 250 and provide the matching indications to the particular clouds 205 and third-party controlled systems 210. For instance, the marketplace engine 240 can be configured to match the indications 245 and 250 based on which of the computing resources offered and computing resources desired match or most closely match. Likewise, the marketplace engine 240 can be configured to match the indication 245 and 250 based on which of the values offered or the values sought match or most closely match.

In 510, the process can end, but the process can return to any point and repeat.

Figure 6:
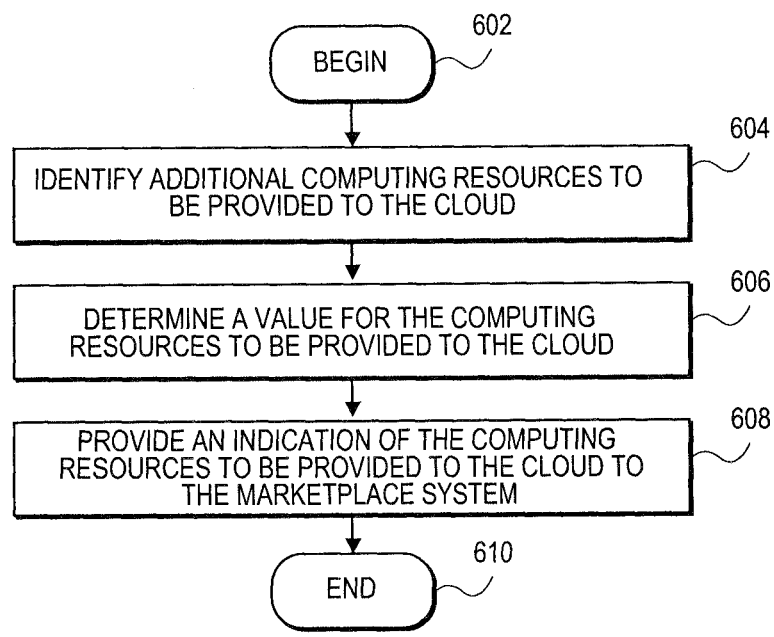
FIG. 6 illustrates a flowchart of an exemplary process for valuating computing resources, according to various embodiments.

FIG. 6 illustrates a flow diagram of an exemplary process for the valuation of resources in a cloud computing environment, according to embodiments. In 602, processing can begin. In 604, the cloud management system 230 can identify additional computing resources to be provided to the cloud 205. For example, one or more of the cloud management systems 230 can be required to add additional resources to the pool of resources 225 in order to meet the demands placed on the clouds 205. For instance, one of the clouds 205 can be near 100% utilization of the pool of resources 225 based on the current processes instantiated in the cloud, or, likewise, based on current demand, the cloud management system 230 can expect increased utilization of the pool of resources 225 at a fixture point. Additionally, one or more of the cloud management systems 230 can desire to increase the pool of resources 225 for any reason, such as increasing revenue generated by the cloud.

In 606, the cloud management system 230 can determine a value for the computing resources to be provided to the cloud 205. For example, the valuation engine 235 can be configured to determine a value for the computing resources from third-party computing resources. The valuation engine 235 can be configured to determine the value for the computing resources of third-party controlled systems 210 based on a number of factors such as usage of the pool of resources 225, estimated demand on the pool of resources 225, revenue generated by the pool of resources 225, values placed on resources desired and offered in the marketplace, and the like.

In 608, the cloud management system 230 can provide an indication of the computing resources to be provided to the cloud 205 to the marketplace system 215. For example, the cloud management system 230 can provide an indication 245 to the marketplace system 215, via the interface 242. The indication 245 of the computing resources desired by the clouds 205 can include a variety of information describing the computing resources desired by the cloud 205. For example, the indication 245 can include the type of computing resources desired processing cycles, memory, storage, bandwidth, operating systems, applications, etc.), the amount of computing resources desired, and the value for the desired computing resources as determined by the valuation engine 235.

In 610, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been described with reference to the exemplary embodiments thereof those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   receiving a request to instantiate a virtual machine in a cloud;
   determining a specification for resources to instantiate the virtual machine in view of a type of the virtual machine;
   receiving, by a processor, a value offered for the resources to instantiate the type of the virtual machine, wherein the specification for resources to instantiate the type of the virtual machine defines at least one of an amount of memory, an amount of computing cycles, an amount of communications bandwidth, an amount of storage, or software resources for the type of the virtual machine;
   receiving, by the processor, a plurality of specifications for resources that are offered by a respective plurality of computing systems;
   determining a value for at least one specification of the plurality of specifications for resources that are offered by the respective plurality of computing systems in view of an amount of time for providing the resources to instantiate the virtual machine and in view of a comparison with other values for resources of other clouds; and matching, by the processor, the specification for the resources to instantiate the type of the virtual machine and the value offered for the resources to instantiate the type of the virtual machine with at least one specification for resources offered of the plurality of specifications for resources offered and the value determined for the at least one specification for resources that are offered.

2. The method of claim 1, further comprising providing the at least one specification for resources offered to the cloud.

3. The method of claim 1, wherein the value offered is in view of at least one of usage of cloud resources, estimated change in the usage of the cloud resources, revenue generated by the cloud resources, or a duration the resources desired are provided to the cloud.

4. The method of claim 1, wherein the value offered comprises at least one of a value offered for an amount of memory, a value offered for an amount of computing cycles, a value offered for an amount of communications bandwidth, a value offered for an amount of storage, or a value offered for software resources.

5. The method of claim 1, further comprising providing an interface for the cloud and at least one of the computing systems to communicate.

6. The method of claim 1, wherein the plurality of specifications for resources offered comprises at least one of an amount of memory, an amount of computing cycles, an amount of communications bandwidth, an amount of storage, or software resources.

7. A system comprising: a memory; and a processor, operatively coupled with the memory, to: receive a request to instantiate a virtual machine in a cloud; determine a specification for resources to instantiate the virtual machine in view of a type of the virtual machine; receive a value offered for the resources to instantiate the type of the virtual machine, wherein the specification for resources to instantiate the type of the virtual machine defines at least one of an amount of memory, an amount of computing cycles, an amount of communications bandwidth, an amount of storage, or software resources for the type of the virtual machine; receive a plurality of specifications for resources that are offered by a respective plurality of computing systems; determine a value for at least one specification of the plurality of specifications for resources that are offered by the respective plurality of computing systems in view of an amount of time for providing the resources to instantiate the virtual machine and in view of a comparison with other values for resources of other clouds; and match the specification for the resources to instantiate the type of the virtual machine and the value offered for the resources to instantiate the type of the virtual machine with at least one specification for resources offered of the plurality of specifications for resources offered and the value determined for the at least one specification for resources that are offered.

8. The system of claim 7, wherein the value to be offered is further in view of at least one of usage of cloud resources, estimated change in the usage of the cloud resources, revenue generated by the cloud resources, or a duration the resources desired are provided to the cloud.

9. The system of claim 7, wherein the value to be offered for the resources to instantiate the type of the virtual machine comprises at least one of a value to be offered for an amount of memory, a value to be offered for an amount of computing cycles, a value to be offered for an amount of communications bandwidth, a value to be offered for an amount of storage, or a value to be offered for software resources.

10. The system of claim 7, wherein the processor is further to receive at least one specification for resources offered by the plurality of computing systems that matches the specification for the resources to instantiate the virtual machine.

11. The system of claim 7, wherein the processor is further to receive at least one specification for resources offered by the plurality of computing systems that matches the value.

12. The system of claim 7, wherein the processor is further to identify the values placed on the other resources by the other clouds.

13. The system of claim 12, wherein to identify the values placed on the other resources by the other clouds, the processor is further to communicate with a marketplace for computing resources to identify the values placed on the other resources by the other clouds.

14. A non-transitory computer readable medium including instructions that, when executed by a processor, cause the processor to:
receive a request to instantiate a virtual machine in a cloud;
determine a specification for resources to instantiate the virtual machine in view of a type of the virtual machine;
receive a value offered for the resources to instantiate the type of the virtual machine, wherein the specification for resources to instantiate the type of the virtual machine defines at least one of an amount of memory, an amount of computing cycles, an amount of communications bandwidth, an amount of storage, or software resources for the type of the virtual machine;
receive a plurality of specifications for resources that are offered by a respective plurality of computing systems;
determine a value for at least one specification of the plurality of specifications for resources that are offered by the respective plurality of computing systems in view of an amount of time for providing the resources to instantiate the virtual machine and in view of a comparison with other values for resources of other clouds; and
match, by the processor, the specification for the resources to instantiate the type of the virtual machine and the value offered for the resources to instantiate the type of the virtual machine with at least one specification for resources offered of the plurality of specifications for resources offered and the value determined for the at least one specification for resources that are offered.

15. The non-transitory computer readable medium of claim 14, wherein the processor is further to provide the at least one specification for resources offered to the cloud.

16. The method of claim 1, further comprising:
providing, by the processor, an indication of the specification for the resources to instantiate the type of the virtual machine and the value offered to at least one of the plurality of computing systems; and
providing, by the processor, an indication of the plurality of specifications for the resources offered to the cloud.

17. The non-transitory computer readable medium of claim 14, wherein the processor is further to: provide an indication of the specification for the resources to instantiate the type of the virtual machine and the value offered to at least one of the plurality of computing systems; and provide an indication of the plurality of specifications for the resources offered to the cloud.

18. The non-transitory computer readable medium of claim 14, wherein the value offered is in view of at least one of usage of cloud resources, estimated change in the usage of the cloud resources, revenue generated by the cloud resources, or a duration the resources desired are provided to the cloud.

19. The non-transitory computer readable medium of claim 14, wherein the value offered comprises at least one of a value offered for an amount of memory, a value offered for an amount of computing cycles, a value offered for an amount of communications bandwidth, a value offered for an amount of storage, or a value offered for software resources.

20. The non-transitory computer readable medium of claim 14, wherein the processor is further to provide an interface for the cloud and at least one of the computing systems to communicate.

\* \* \* \* \*